(12) United States Patent
Dupuis et al.

(10) Patent No.: US 8,114,926 B2
(45) Date of Patent: Feb. 14, 2012

(54) BITUMINOUS BINDER AND METHOD FOR THE PRODUCTION THEREOF

(75) Inventors: Dominique Dupuis, Crepy en Valois (FR); Didier Lesueur, Madrid (ES); Juan José Potti, Madrid (ES); Gilles Orange, Soisy sous Montmorency (FR); John Godber, Lawrenceville, NJ (US)

(73) Assignees: Eurovia, Rueil-Malmaison (FR); Innophos, Inc., Cranbury, NJ (US)

( * ) Notice: Subject to any disclaimer, the term of this patent is extended or adjusted under 35 U.S.C. 154(b) by 1206 days.

(21) Appl. No.: 10/548,091

(22) PCT Filed: Mar. 8, 2004

(86) PCT No.: PCT/FR2004/000543
§ 371 (c)(1),
(2), (4) Date: Jul. 3, 2006

(87) PCT Pub. No.: WO2004/081098
PCT Pub. Date: Sep. 23, 2004

(65) Prior Publication Data
US 2006/0250886 A1 Nov. 9, 2006

(30) Foreign Application Priority Data

Mar. 7, 2003 (FR) .................................. 03 02896

(51) Int. Cl.
*C08K 5/42* (2006.01)
(52) U.S. Cl. ............... 524/59; 524/68; 524/69; 524/417
(58) Field of Classification Search .............. 524/59–71, 524/417
See application file for complete search history.

(56) References Cited

U.S. PATENT DOCUMENTS

| | | |
|---|---|---|
| 4,772,648 A | 9/1988 | Demangeon et al. |
| 4,992,492 A | 2/1991 | Sainton |
| 5,070,123 A | 12/1991 | Moran |
| 5,095,055 A | 3/1992 | Moran |
| 5,225,462 A | 7/1993 | Mancini |
| 5,288,773 A | 2/1994 | Gorbaty et al. |
| 5,336,705 A | 8/1994 | Gorbaty et al. |
| 5,348,994 A | 9/1994 | Gorbaty et al. |
| 5,385,401 A | 1/1995 | Nath |
| 5,565,510 A | 10/1996 | Giavarini et al. |
| 5,618,862 A | 4/1997 | Germanaud et al. |
| 5,880,185 A | 3/1999 | Planche et al. |
| 5,990,206 A | 11/1999 | Tanaka et al. |
| 6,011,095 A | 1/2000 | Planche et al. |
| 6,031,029 A | 2/2000 | Baumgardner et al. |
| 6,043,302 A | 3/2000 | Spendlove |
| 6,117,926 A | 9/2000 | Engber et al. |
| 6,228,909 B1 | 5/2001 | Baumgardner et al. |
| 6,399,680 B1 | 6/2002 | Engber et al. |
| 6,414,056 B1 | 7/2002 | Puzic et al. |
| 6,808,558 B2 | 10/2004 | Dupuis et al. |
| 7,074,846 B2 * | 7/2006 | Sylvester et al. ............... 524/71 |
| 2004/0000256 A1 | 1/2004 | Dupuis et al. |

FOREIGN PATENT DOCUMENTS

| | | |
|---|---|---|
| DE | 2255173 | 11/1972 |
| EP | 0 202 966 B1 | 10/1988 |
| EP | 0 496 457 B1 | 3/1994 |
| EP | 0 710 700 A1 | 5/1996 |
| EP | 0 448 425 B1 | 6/1996 |
| EP | 0 618 275 B1 | 6/1997 |
| EP | 0 792 918 A2 | 9/1997 |
| EP | 0 703 949 B1 | 6/1998 |
| FR | 2 493 329 | 5/1982 |
| FR | 2 512 827 | 3/1983 |
| FR | 2 567 447 A1 | 1/1986 |
| FR | 2 619 821 A1 | 3/1989 |
| FR | 2 732 702 A | 10/1996 |
| FR | 2 764 897 A | 12/1998 |
| FR | 2 792 943 A1 | 11/2000 |
| FR | 2 803 608 A1 | 7/2001 |
| FR | 2004/003083 A1 | 1/2004 |
| GB | 2087407 | 5/1982 |
| GB | 2350366 | 11/2000 |
| JP | 51-53522 | 5/1976 |
| JP | 62-501854 A | 7/1987 |
| JP | 8-512089 | 12/1996 |
| JP | 10-182981 A | 7/1998 |
| JP | 11-79813 A | 3/1999 |
| WO | WO-95/28446 A | 10/1995 |
| WO | WO-96/28513 A1 | 9/1996 |
| WO | WO-96/37658 A1 | 11/1996 |
| WO | WO-97/14753 A1 | 4/1997 |

(Continued)

OTHER PUBLICATIONS

Planche et al., Evaluation of the Low Temperature Properties of Bituminous Binders Using Calorimetry and Rheology, Eurobitume, Luxembourg (1995).

(Continued)

*Primary Examiner* — Peter D Mulcahy
(74) *Attorney, Agent, or Firm* — Birch, Stewart, Kolasch & Birch, LLP

(57) ABSTRACT

The invention relates to a method for the production of a bituminous binder and a bituminous binder which can be obtained according to said method. The method for the preparation of the bituminous binder comprises a mixing stage of 0.05 5 wt. % acid, 0.5 25 wt. % rubber crumbs and 70 99.5 wt. % bitumen. The invention also relates to bituminous concretes comprising said binder and a method for the production and use thereof.

21 Claims, No Drawings

FOREIGN PATENT DOCUMENTS

| WO | WO-97/43342 A1 | 11/1997 |
| WO | WO-98/44047 A1 | 10/1998 |
| WO | WO-99/58600 A1 | 11/1999 |
| WO | WO-01/49939 | 7/2001 |

OTHER PUBLICATIONS

Brule et al., Polymer Modified Binders for Hot Mixtures: Proposals for Performance Based Specifications, Carreteras, vol. 121 (2002) (with English translation).

Good Expectation of the Modification of Asphalt Using Recycled Rubber Crumb in the Road Application; 2002; pp. 38-39.

* cited by examiner

BITUMINOUS BINDER AND METHOD FOR THE PRODUCTION THEREOF

The subject of the present invention is a method for preparing a bituminous binder, the bituminous binder obtainable by this method and bituminous concretes containing this binder.

Bituminous binders are used in particular in the areas of roadways, roofing materials, surface coatings and sealants. The use of asphalt can be cited for building roadways.

In the meaning of the present invention, by bituminous binder is meant bitumens and/or any compositions containing bitumens. By bituminous binder is therefore meant in this invention both a binder containing pure bitumen and binders containing any type of usual additives, polymers in particular. Within the scope of this invention the terms binder or bituminous binder will be used indifferently.

In general, bituminous concretes contain a bituminous binder and aggregates or mineral fillers. These may be stones or gravel, sand and fines. Bituminous concretes may also be called bituminous mixes.

However, said binders have numerous drawbacks when used as such for different applications: in particular high sensitivity to temperature may be mentioned, limited adhesion to aggregates, poor properties at low temperatures, low resistance to fatigue and impact.

In addition, bituminous binders are difficult to handle and require specific technologies.

Therefore, for roadways and in particular the wearing course, the main constituents are bituminous concretes consisting of approximately 95 weight % aggregate and approximately 5 weight % bitumen used as binder. In this case, the bitumen's role as binder is predominant in respect of the properties of the roadway subjected to various stresses of mechanical origin: thermal fracture, fatigue and rutting.

At low temperatures, in the region of approximately −10° C., the binder develops towards a glass state and becomes brittle. Long transverse fissures may form due to thermal stresses, called transverse thermal cracking.

At a higher temperature of around 0° C., the roadway may still crack due to fatigue. This leads to a multitude of, chiefly longitudinal, interconnected cracks.

Finally, at higher temperatures of around 60° C. and over the binder becomes increasingly more fluid and changes from a viscoelastic state to a Newtonian viscous state with increasingly lower viscosity. Therefore the repeated passing on the roadway of heavy weights i.e. vehicles including heavy goods vehicles, contributes towards permanently deforming the mix and hence permanently the bituminous binder with subsequent deformation of the roadway. This phenomenon causes rutting.

The binder also ensures waterproofing of the roadway, thereby protecting the road sub-structure.

The main characteristics required for roadways and hence for bituminous binders are therefore good resistance to cracking at low temperatures, typically temperatures of around −15° C. or less, and minor deformation at high temperatures, typically at temperatures of around 60° C. or over, as well as good resistance to fatigue to improve durability.

Industrialists generally use additives to overcome the deficiencies of bituminous binders and thereby to improve their properties, their Theological properties in particular.

It is especially known to add mineral acids or phosphor compounds to these bituminous binders. International patent WO98/44047 for example describes a mixture of bitumen, polymers and polyphosphoric acid. The addition of acid improves the viscoelastic properties of the bituminous binder both at low temperatures and at high temperatures. Also, this addition of acid makes it possible to maintain the good properties of the mixture with a lower quantity of added polymers. According to international patent WO 96/28513, treatment of a bitumen and added polymer mixture with an acid-type adjuvant can promote chemical bonding between the bitumen and the polymers.

It is also known to add vulcanized crumb rubber to these bituminous binders. French patent application FR 2 764 897 for example describes a mix of bitumen, rubber crumb and copolymers used as roadway binder. French patent application FR 2 732 702 describes a mix of bitumen, rubber crumb and digestion catalysts, which are olefin-unsaturated synthetic polymers such as copolymers of SBS, SBR, EVA, EMA, EPDM type, and nitrile rubber. French application FR 2 657 447 describes a method for preparing a bitumen-rubber mix.

The addition of rubber to bitumen makes it possible to improve mix properties, to impart greater flexibility to the roadway surface, to improve its fatigue resistance at low temperatures and to reduce phenomena of noise and reflection of light sources. The use of waste rubber for this purpose also contributes towards recycling old tyres of various origins.

Rubber crumb may be used either by adding it to the sand and aggregate mixture, by so-called "dry" incorporation, or it can be directly hot incorporated into the binder, known as "wet" incorporation. The resulting properties differ according to the technology used.

Hot incorporation of rubber crumb into bitumen makes it possible to modify the properties of the binder.

However, the use of this rubber crumb is not problem-free since these products must be used in relatively high percentages which raises problems relating to their incorporation into the bitumen and to the viscosity of the resulting bitumen mix.

In surprising manner, the Applicant has found that by incorporating rubber crumb and acid into the bitumen, it is possible to improve the properties of the bituminous binder, in particular its rheological properties.

In surprising manner, the Applicant has ascertained a synergy between the acid and the rubber crumb.

The subject of the present invention is therefore a method for preparing a bituminous binder comprising the following successive steps:

a) mixing 0.05 to 5 wt. % acid, 0.5 to 25 wt. % rubber crumb and 70 to 99.5 wt. % bitumen heated to a temperature of between 120 and 220° C., b) heating the mixture to a temperature of between 120 and 220° C. for a time of between 15 minutes and 10 hours, advantageously between 15 minutes and 3 hours, under stirring, and c) optionally, degassing the air bubbles which may be present in the mixture.

In the meaning of the present invention, by acid is meant any Bronsted and Lewis acid. They may be mineral or organic acids.

In the meaning of the present invention, by mineral acid is meant hydrochloric, nitric, sulphuric, phosphorous, hydrophosphoric, phosphoric, poly-phosphoric, sulphonic acids or the metal salts of these acids, such as nitrates, sulphates, and the chlorides of iron, cerium, copper, aluminium for example.

In the meaning of the present invention by organic acid is meant mono or polycarboxylic acids having between 1 and 22 carbon atoms, in particular tartaric acid, citric acid, oxalic acid, sulphonic acid, adipic acid, advantageously having more than 8 carbon atoms, organophosphate acids, organophosphonate acids, in particular alkylphosphonic acids (OPA), organophospinate acids, amino acids, amino phosphonic acids (AMPA), amino phosphoric acids, aminophosphinic acids, carbamic acids, organothiophosphoric acids, organothiophosphonic acids, organothiophosphinic acids, thioic acids.

Advantageously, the acid used is a sulphuric acid, a phosphoric acid, a polyphosphoric acid or an organophosphate acid. Further advantageously, the added acid is a phosphoric acid or a polyphosphoric acid.

Advantageously, the phosphoric acid is orthophosphoric acid, also called monophosphoric acid having the formula $H_3PO_4$. The polyphosphoric acids of the invention may be chosen from among those described in the book titled "Phosphorus, an outline of its Chemistry, Biochemistry and Uses" Fifth Edition, D. E. C. Corbridge, Elsevier, 1995 pages 170 and 180 to 182.

Polyphosphoric acid is advantageously chosen from among pyrophosphoric acid or diphosphoric acid having the formula $H_4P_2O_7$, triphosphoric acid having the formula $H_5P_3O_{10}$, polyphosphoric acids having the formula $H_{n+2}P_nO_{3n+1}$, metaphosphoric acids having the formula $H_nP_nO_{3n}$ or their mixtures.

As indicated page 181 of the document "Phosphorus, an outline of its Chemistry, Biochemistry and Uses" mentioned above, phosphoric acid or commercially available polyphosphoric acids are characterized by their $P_2O_5$ or $H_3PO_4$ equivalent expressed as a percentage in relation to the weight of the acid.

There exists therefore a class of so-called superphosphoric acids whose $H_3PO_4$ equivalent is greater than 100. These superphosphoric acids are the most advantageous polyphosphoric acids.

The acids may be used in free form or in salt form.

The acids may be in liquid or solid form. When the acids are in liquid form, they may be made into powder form by impregnating a porous mineral support with ortho or polyphosphoric acid. The porous mineral support is a high porosity mineral solid, its volume is advantageously at least 1 ml/g, further advantageously at least 3 ml/g. It is chosen in particular from among silicas, aluminas, silicoaluminates.

The advantage of using a compound containing phosphoric acid or polyphosphoric acid on a high porosity mineral solid is that it is in powder or granule form and can therefore be easily handled compared with liquid acid solutions which are highly viscous.

A further advantage of this compound is that it can reinforce the bituminous products in which it is incorporated, in particular regarding their rigidity at high temperature.

Finally, this compound maintains the same properties as those of phosphoric or polyphosphoric acids.

According to one advantageous variant of the invention, the weight quantity of acid added at step a) lies between 0.5 and 2 wt. % with respect to the total weight of the mix.

Rubber crumb can be obtained from natural or synthetic rubber, of styrene-butadiene type, or by grinding tyres, rubber mats or shoe soles.

As examples of rubber crumb compositions, the following approximate compositions are given:

|  | Light vehicles | Heavy vehicles |
| --- | --- | --- |
| Rubber/elastomers | 48% | 45% |
| Carbon black/silica | 22% | 22% |
| Metal | 15% | 25% |

-continued

|  | Light vehicles | Heavy vehicles |
| --- | --- | --- |
| Textile | 5% | — |
| Zinc oxide | 1% | 2% |
| Sulphur | 1% | 1% |
| Various other additives | 8% | 5% |

Metals and textiles are evidently removed from the rubber crumb after grinding.

The essential difference between the different types of rubber crumb lies in the type of rubbers which may be one or more synthetic elastomers, such as polybutadiene, SBR, which may be associated with natural rubber in tyres of light vehicles, or natural rubber of heavy vehicle tyres.

DSC, differential scanning calorimetry analysis, of rubber crumb particles shows fairly constant glass transition temperatures in the order of −60° C. for rubber crumb derived from heavy vehicle tyres, being more variable between −35 and −100° C. for rubber crumb derived from light vehicle tyres; this dispersion is most probably due to the diversity of elastomers used.

Particle size is defined by the grinding factories which offer a wide number of grades depending upon intended use. The most frequent grades correspond to a particle size of between 0.5 and 1.5 mm, 1 and 2 mm, 1 and 3 mm, 1 and 4 mm, 1 and 5 mm, 1 and 6 mm, 1 and 7 mm.

Within the scope of the present invention, the rubber crumb has a diameter of less than 5 mm, advantageously rubber crumb diameter is between 0.0001 and 2 mm, further advantageously less than 1.5 mm.

According to one advantageous variant of the invention, the weight percentage of the rubber crumb added to the mixture at step a) lies between 1 and 10 wt. % with respect to the total weight of the mix, further advantageously between 3 and 7 wt. % with respect to the total weight of the mix.

The total quantity of bitumen added to the mix corresponds to the total weight of the mix less the weight of the added quantities of acid and rubber crumb.

In the meaning of the present invention, by bitumen is meant both any pure bitumen composition and any bitumen-based composition containing any type of usual additives, polymers in particular.

According to another advantageous variant of the invention, the bitumen added at step a) is heated to a temperature of between 140 and 190° C.

The mixture obtained at step b) is then advantageously heated to a temperature of between 140° C. and 190° C.

The new method is conducted under gentler conditions than for prior art hot methods in which the bitumen had to be heated to a high temperature to facilitate swelling of the rubber crumb. This also limits bitumen oxidation phenomena and shortens the homogenisation time of a conventional polymer-bitumen mix.

According to an advantageous variant of the invention, step a) is performed by mixing the bitumen and acid followed by adding the rubber crumb.

According to another advantageous variant of the invention, step a) is performed by pre-mixing the acid and rubber crumb before adding them to the bitumen.

According to a further advantageous variant, step a) is performed by mixing at least part of the bitumen and rubber crumb followed by addition of the acid and optionally a final addition of the remaining quantity of bitumen.

A further subject of the invention is a bituminous binder obtainable using the above described method.

The viscosity ratio at 135° C. between a bituminous binder comprising crumb rubber but no acid, a so-called acid-free binder, and a bituminous binder of the invention, called acid-containing binder, lies between 10 and 70%, advantageously between 10 and 50%. The bitumen used for the fabrication of the acid-free binder and the acid-containing binder is identical, in particular it contains the same additives such as polymers with the exception of the acid. The bituminous binder of the invention is less viscous than an acid-free binder at similar temperature.

The critical temperature difference between the bituminous binder containing crumb rubber but no acid, so-called acid-free binder, and a bituminous binder of the invention, called acid-containing binder, lies between 1 and 50° C., advantageously between 1 and 25° C. The bitumen used for fabricating the acid-free binder and for the acid-containing binder is identical, in particular it comprises the same additives such as polymers with the exception of the acid. The bituminous binder of the invention has a higher critical temperature than the acid-free binder, the critical temperature being measured using the same operating mode.

The critical temperature, as per the AASHTO standard, can be measured using a so-called hot operating mode or a so-called cold operating mode.

The determination of critical temperature using a hot operating mode is described in standard HTPP5-98 or EN1427. The softening point (critical temperature) is measured using the so-called Ring and Ball Test.

Determination of critical temperature using the cold operating mode is described in standard HTPP1-98 or AASHTO. The deformation temperature under stress is determined using the Bending Beam Rheometer test (BBR).

With the method of the invention, it is possible to obtain a bituminous binder containing a lower percentage of rubber crumb but having the same properties, especially rheological properties, as a bituminous binder of the prior art containing a higher percentage of crumb rubber.

The bituminous binder of the invention may also be prepared in the form of a master-mix with higher concentrations of acid and rubber crumb which is then hot diluted with pure bitumen and/or with any bituminous binder so as to obtain a bituminous binder having the desired concentrations of acid and rubber crumb and the desired properties, in particular Theological properties.

The bituminous binder of the invention may be used in construction materials, roofing materials in particular. It can also be used as sealant, as surface coating or as reflective cracking prevention system.

The bituminous binder of the invention can also be used as a polymer bitumen, in the hot or cold production of bituminous concrete which can be especially used as road wearing course or substructure surface, as surface coating or as a reflective cracking prevention system.

The subject of the present invention is also a bituminous concrete containing the binder of the invention and the necessary quantity of aggregate.

The present invention also concerns a method for preparing said bituminous concrete.

According to an advantageous variant of the invention, the bituminous concrete is prepared using a hot process. The aggregate is added to the binder of the invention, under stirring, at a temperature of between 120 and 220° C. Advantageously, the aggregate is added to the binder under stirring at a temperature of between 120 and 190° C.

According to an advantageous variant of the invention, the bituminous concrete is prepared using a cold process. The cold process for preparing bituminous concrete comprises the following steps:

i) preparing an emulsion of bitumen by mixing water, a bituminous binder of the invention and an emulsifier at ambient temperature, ii) incorporating aggregate into the bitumen emulsion obtained at step i) under stirring at ambient temperature, iii) spreading the emulsion obtained at step ii) to obtain a uniform layer of the mixture obtained at step ii), iv) breaking the bitumen emulsion.

Any type of emulsifier may be used at step i).

According to one variant of the invention, the rubber crumb optionally pre-mixed with the acid, is added at the same time as the aggregate to the bitumen, optionally containing the acid.

Preferably the aggregate is added subsequently to the bitumen/rubber crumb/acid mixture i.e. in the binder of the invention.

The concrete of the invention is used for building roadways, in particular for the wearing course of a roadway.

It may also be used as surface coating or reflective cracking prevention system.

A further subject of the present invention is the use of an acid to facilitate the incorporation of rubber crumb into a bituminous binder.

The present invention also concerns a premix containing between 0.02 wt. % and 91 wt. % acid and between 9 and 99.98 wt. % rubber crumb. Advantageously, it contains between 5 and 50 wt. % acid and between 50 and 95 wt. % rubber crumb. Advantageously, it contains between 10 and 20 wt. % acid and between 80 and 90 wt. % rubber crumb. Advantageously, this premix is used in the method for preparing the bituminous binder of the invention.

The following examples illustrate the invention without limiting its scope however.

EXAMPLE 1

Preparation of the Modified Bitumens

The bitumen is placed in a beaker. The beaker is then heated on a hot plate to 170° C. until it is fully liquid.

The additive is then incorporated. The additive may be any additive usually used, in particular a polymer and/or vulcanized rubber crumb and/or acid.

The mixture is maintained at approximately 170° C. for 120 minutes under stirring using a rotary stirrer at 300 rpm. The temperature is maintained strictly below 180° C. so as not to deteriorate the characteristics of the bitumen.

After mixing, the mixture is kept for 10 minutes at approximately 170° C. under slow speed stirring to remove any air bubbles which may have formed.

The mixture is then finished and ready for use.

EXAMPLE 2

Determining the Rheological Properties of a Modified 70/100 SHELL Bitumen

A bitumen of 70/100 Pen grade was used for the tests. It was a bitumen obtained from SHELL, Petit Couronne, France.

1/Rheology Tests

Hot deformation is a determinant factor which must be taken into consideration when formulating bituminous mixes. Binder specifications are designed so that the corresponding mixes have good resistance to rutting. In Europe the properties of binders at high temperatures are evaluated by the Ring and Ball Test. In the United States SHRP has developed a criterion based on the complex shear modulus/phase angle ratio, assessed using the Dynamic Shear Rheometer test (DSR).

The Theological characterization of modified bitumen is made using a procedure derived from SHRP standards (AASHTO TP5-98)

The frequency used ranges from 7.8 Hz to 200 Hz for a temperature range of between 25° C. and 60° C.

Rheological tests are performed under annular shearing using a Metravib RDS VA 2000 viscoanalyzer.

The liquid bitumen is added to the shear cell previously heated to 110° C. When the temperature falls to around 45° C. the bitumen no longer flows and the entire structure is then compact and ready to be measured.

The bitumen sample has a thickness of 1 mm.

The tests are conducted at different temperatures, 30, 40, 50 and 60° C. and over a range of frequencies enabling evidencing of the material's behaviour, i.e. at 7.8-15.6-31.2-62.5-125 and 200 Hz.

2/Rheological Properties of Modified Bitumen in the Presence of Polymer in Vulcanized Rubber Form.

The results obtained concern the complex shear modulus $G^*$, the elastic component $G'$ and viscous component $G''$ of the modulus, and the phase angle $\delta$.

These results can be represented either at iso-frequency (isochrones) in relation to temperature, or at iso-temperature (isotherms) in relation to frequency.

In this example the bitumen preparation methods and rheology tests were conducted as described previously.

Vulcanized rubber crumb is a crumb obtained by cryo-grinding heavy vehicle tyres: particle size Dmax<500 microns (Micronis).

The SBS polymer (linear SBS) is a micronized powder: D1101 Kraton.

The polyphosphoric acid used (PPA) is a 105% condensed acid (Rhodia).

Four products were compared:
i) Reference bitumen: Shell 70/100 with no additive;
ii) and iii) Bitumen with added vulcanized rubber crumb: 5 and 10 wt. %
iv) Bitumen with added styrene-butadiene-styrene (SBS): 3 wt. %.

Table I below groups together the values measured at 60° C. for a frequency of 7.8 Hz.

TABLE I

|  | $G^*$ (10 Pa) | $G'$ ($10^3$ Pa) | $G''$ ($10^3$ Pa) | $\delta$ |
|---|---|---|---|---|
| Shell 70/100 | 10.275 | 0.950 | 10.400 | 85.2 |
| Shell + 5% rubber | 13.630 | 1.593 | 13.540 | 83.2 |

TABLE I-continued

|  | $G^*$ (10 Pa) | $G'$ ($10^3$ Pa) | $G''$ ($10^3$ Pa) | $\delta$ |
|---|---|---|---|---|
| Shell + 10% rubber | 20.605 | 3.495 | 20.310 | 80.25 |
| Shell + 3% SBS | 20.460 | 4.370 | 19.985 | 77.5 |

The reinforcement, i.e. rigidifying, effect provided by the vulcanized rubber crumb or SBS is clearly seen. An increase in the complex modulus $G^*$ is observed and especially of its viscous component $G''$, in the presence of 10 wt. % vulcanised rubber crumb or SBS.

The phase angle $\delta$ is substantially reduced, which translates as a much more elastic behaviour of the bitumen with added vulcanized rubber crumb or SBS.

The addition of 10 wt. % vulcanized rubber crumb leads to obtaining a modified bitumen with distinctly marked elastic behaviour, very close to that obtained with 3 wt. % SBS.

Table 2 below groups together the values of modulus $G^*$ at 25° C. and of phase angle $\delta$ at 40° C. and the critical temperature Tc for a frequency of 7.8 Hz.

The critical temperature Tc is determined using a criterion inspired from SHRP procedure. Tc is the temperature at which the ratio $G^*/\sin\delta$ is greater than 1100 Pa.

The thermal susceptibility of bitumen is determined using a susceptibility index S.I. which is the thermal susceptibility index S.I. defined by the slope, called a, of the line log $G^*=f(T)$ at 7.8 Hz.

This gives the following equation:

$$\frac{20 - SI}{10 + SI} = 50.|a|$$

TABLE 2

|  | $G^*$ 25° C. ($10^6$ Pa) | $G'$ 25° C. ($10^6$ Pa) | $G''$ 25° C. ($10^6$ Pa) | $\delta$ 40° C. | Tc (° C.) | S.I. |
|---|---|---|---|---|---|---|
| Shell 70/100 | 3.5 | 1.5 | 3.25 | 78.5 | 72.25 | −3.60 |
| Shell + 5% crumb rubber | 2.55 | 1.43 | 2.12 | 72 | 76.3 | −3.00 |
| Shell + 10% crumb rubber | 5.50 | 3.12 | 4.50 | 67.1 | 77.25 | −3.25 |
| Shell + 3% SBS powder | 2.80 | 1.32 | 2.48 | 70.6 | 80.9 | −2.58 |

The critical temperature Tc is largely increased in the presence of vulcanized rubber crumb, on and after the addition of 5 wt. % vulcanized rubber crumb.

Similarly, a substantial lowering of the thermal sensitivity index SI is noted as soon as vulcanized rubber crumb at 5 wt % is added.

The phase angle $\delta$ at a temperature of 40° C. is largely reduced which translates as a more elastic behaviour of the modified bitumen. This effect is all the more noticeable the higher the content of vulcanized rubber crumb.

A substantial modulus gain is noted, i.e. of the complex shear modulus $G^*$, the elastic modulus $G'$ and viscosity modulus $G''$ at ambient temperature 25° C. with the addition of 10 wt. % vulcanized rubber crumb.

3/Rheological Properties of the Bitumen Modified with Polyphosphoric Acid in the Presence of the Polymer in Vulcanized Rubber Form.

The results obtained relate to the complex modulus $G^*$, elastic component $G'$ and viscous component $G''$, and the phase angle $\delta$ in relation to frequency and temperature. In this example, the Shell bitumen was used as in the preceding example, the bitumen preparation methods and the rheology tests being conducted as described previously.

Two products were compared:
i) Reference bitumen Shell 70/100 with no additive;
ii) Bitumen modified with 1 wt. % polyphosphoric acid (PPA) with added 5 wt. % vulcanized rubber crumb.

Table 3 below groups together the values measured at 60° C. with a frequency of 7.8 Hz.

TABLE 3

|  | G* ($10^3$ Pa) | G' ($10^3$ Pa) | G" ($10^3$ Pa) | δ |
|---|---|---|---|---|
| Shell 70/100 | 10.275 | 0.950 | 10.400 | 85.2 |
| Shell + 1% PPA acid + 5% crumb | 23.828 | 5.463 | 23.193 | 76.75 |

The presence of polyphosphoric acid (1 wt. %) makes it possible to largely reduce the rubber crumb content while maintaining performance.

Therefore through the addition of 5 wt. % vulcanized rubber crumb in the presence of polyphosphoric acid (1 wt. % PPA) it is possible to obtain markedly improved rheological properties. An increase in modulus values G' and G" is observed with a substantial reduction in the phase angle δ. This clearly shows the reinforcement effect, i.e. rigidifying effect, provided by the addition of vulcanized rubber crumb associated with polyphosphoric acid. The behaviour of the modified bitumen is distinctly more elastic i.e. less sensitive to irrecoverable deformation.

Performance characteristics obtained at 60° C. with 1 wt. % polyphosphoric acid and 5 wt. % vulcanized rubber crumb are better than those measured with 3 wt. % SBS.

Table 4 below groups together the values of modulus G* at 25° C. and phase angle δ at 40° C., together with the critical temperature Tc at a frequency of 7.8 Hz.

The critical temperature Tc is determined using the criterion inspired from SHRP procedure. Tc is the temperature at which the ratio G*/sin δ is greater than 1100 Pa.

The thermal susceptibility of the bitumen is determined using the S.I. thermal susceptibility index.

TABLE 4

|  | G* 25° C. ($10^6$ Pa) | G' 25° C. ($10^6$ Pa) | G" 25° C. ($10^6$ Pa) | δ 40° C. | Tc (° C.) | S.I. |
|---|---|---|---|---|---|---|
| Shell 70/100 | 3.5 | 1.5 | 3.25 | 78.5 | 72.25 | −3.60 |
| Shell + 1% PPA acid + 5% rubber crumb | 5.2 | 3.02 | 4.24 | 66.5 | 79.0 | −3.05 |

The elastic properties at ambient temperature 25° C. are greatly increased: the complex modulus G* and modulus values G' and G" are much higher.

The critical temperature Tc is strongly increased through the association of polyphosphoric acid (1 wt. %) and vulcanized rubber crumb (5 wt. %).

Similarly, a substantial drop is observed in the thermal susceptibility index SI of the bitumen modified with polyphosphoric acid (1 wt. %) and vulcanized rubber crumb (5 wt. %).

The phase angle δ at 40° C. is very largely reduced in the bitumen with added polyphosphoric acid (1 wt. %) and vulcanized rubber crumb (5 wt. %) which translates as a more elastic behaviour of the modified bitumen. This angle is lower than the one obtained using bitumen modified with 3 wt. % SBS polymer powder.

Modifying the bitumen with a mixture of polyphosphoric acid (1%) and vulcanized rubber crumb (5 wt. %) leads to achieving the performances of polymer modified bitumens (PMBs) containing 3 wt. % SBS polymer.

With the use of polyphosphoric acid (1 wt. %) the quantity of added vulcanized rubber crumb can be largely reduced while maintaining the properties of the resulting bitumen: these are improved compared with the same bitumen modified with 10 wt. % vulcanized rubber crumb.

This reduction in the vulcanized rubber crumb content substantially improves the rheology of the liquid bitumen at 160° C.

4/Brookfield Viscosity of the Bitumen Modified with Polyphosphoric Acid in the Presence of Polymer in the Form of Vulcanized Rubber The Brookfield viscosity of bitumens and modified bitumens prepared as described above was measured between 120° C. and 160° C.

Five products were compared:
i) Reference bitumen Shell 70/100 with no additive;
ii) Bitumen modified with 1 wt. % polyphosphoric acid (PPA);
iii) and iv) Bitumen with added vulcanized rubber crumb: 5 and 10 wt. %;
iv) Bitumen modified with the 1 wt. % polyphosphoric acid and 5 wt. % vulcanized rubber crumb.

Viscosity values at 135° C. are given in Table 5:

TABLE 5

|  | Brookfield viscosity η (cPs) |
|---|---|
| Shell 70/100 | 480 |
| Shell + 1% PPA acid | 690 |
| Shell + 10% rubber crumb | 1500 |
| Shell + 5% rubber crumb | 945 |
| Shell + 1% PPA acid + 5% rubber crumb | 1075 |

The viscosity of the modified bitumen is greatly increased through the addition of 10 wt. % vulcanized rubber crumb.

The advantage of the presence of polyphosphoric acid (1 wt. %) can be clearly seen: the combination of 1 wt. % polyphosphoric acid+5 wt. % vulcanized rubber crumb imparts advantageous viscosity to the bitumen.

EXAMPLE 3

Determination of the Rheological Properties of a Modified 80/100 PROAS Bitumen

A bitumen of Pen grade 80/100 was used for these tests. It was a bitumen made by PROAS, Spain.

1/Additive Evaluation, Modified Bitumen Preparation.

Four grades of vulcanized rubber crumb were compared:
Grade 1: Dmax<500 microns (Mesallès)
Grade 2: Dmax<800 microns (Necaflex)
Grade 3: Dmax<400 microns (Necaflex)
Grade 4: Dmax<400 microns (Necaflex)

Grades 1, 2 and 3 were obtained by mechanical grinding. Grade 4 was obtained by cryo-grinding.

The polyphosphoric acid used (PPA) was a 105% condensed acid (Rhodia).

The bitumen/rubber crumb/acid mixes were made under heat (170° C.) and stirring for 120 minutes (as indicated under example 1).

2/Rheology Tests

Rheological characterization of the modified bitumen was performed according to SHRP procedure (AASHTO-TP5-98): Dynamic Shear Rheometer (DSR) tests.

Rheology tests were performed under annular shear using a Metravib RDS VA 2000 viscoanalyzer. The frequency used ranged from 1.5 Hz to 125 Hz for a temperature range varying between 25° C. and 60° C.

The liquid bitumen was placed in the shearing cell previously heated to 110° C. When temperature dropped to around 45° C. the bitumen no longer flowed and the structural unit was then compacted and ready for measurement testing.

Bitumen sample thickness: 1 mm.

Tests were conducted at different temperatures of 25, 30, 40, 50 and 60° C. and over frequency ranges allowing the evidencing of the material's behaviour i.e. at 1.5-7.8-15.6-31.2-62.5 and 125 Hz.

3/Rheological Properties of Bitumen Modified with Polyphosphoric Acid in the Presence of Vulcanized Rubber Crumb. Effect of Vulcanized Rubber Crumb and Polyphosphoric Acid Content (Grade 1 Crumb)

The results obtained concern the Coulomb modulus also called complex modulus $G^*$, the elastic $G'$ component and viscous component $G''$, and phase angle $\delta$.

The methods for bitumen preparation and conducting of rheology tests were as described previously.

Five products were compared:
i) Reference bitumen (80/100 Proas) with no additive
ii) Bitumen modified with polyphosphoric acid: 1 wt. %
iii) Bitumen modified with vulcanized rubber crumb (Grade 1): 10 wt. %
iv) Bitumen modified with polyphosphoric acid (1 wt. %) with addition of vulcanized rubber crumb (5 wt. %)
v) Bitumen modified with polyphosphoric acid (0.5 wt. %) with added vulcanized rubber crumb (5 wt. %).

Table 6 below groups together the values of modulus $G^*$ at 25° C., of phase angle $\delta$ at 40° C., and of the critical temperature Tc at a frequency of 1.5 Hz.

TABLE 6

|  | $G^*$ −25° C. $10^6$ Pa | $G^*$ −60° C. $10^3$ Pa | $\delta$ −40° C. (Pa) | Tc (° C.) |
|---|---|---|---|---|
| 80/100 Proas bitumen | 0.31 | 1.935 | 76.05 | 64.4 |
| Bitumen + 1% polyphosphoric acid | 0.64 | 7.733 | 60.89 | 76.1 |
| Bitumen + 10% rubber crumb (Grade 1) | 0.776 | 11.307 | 56.73 | 79.5 |
| Bitumen + 1% polyphosphoric acid + 5% rubber crumb | 0.736 | 13.891 | 53.70 | 83.1 |
| Bitumen + 0.5% polyphosphoric acid + 5% rubber crumb | 0.913 | 8.532 | 60.06 | 75.1 |

The reinforcing effect can be clearly seen, i.e. the rigidifying effect provided by the addition of rubber crumb. An increase in the $G^*$ modulus is observed in the presence of 10 wt. % vulcanized rubber crumb.

The phase angle $\delta$ is substantially reduced which translates as a more elastic behaviour of the modified bitumen.

The critical temperature Tc is markedly increased in the presence of vulcanized rubber crumb, on and after the addition of 5 wt. % crumb.

The phase angle $\delta$ at a temperature of 40° C. is largely reduced, which translates as a more elastic behaviour of the modified bitumen.

The best performance is obtained with 1 wt. % polyphosphoric acid+5 wt. % vulcanized rubber crumb.

Table 7 groups together the values of modulus $G^*$ at 25° C. and of the thermal susceptibility index SI.

TABLE 7

|  | $G^*$ −25° C. $10^5$ Pa | $G'$ −25° C. $10^5$ Pa | $G''$ −25° C. $10^5$ Pa | SI |
|---|---|---|---|---|
| 80/100 Proas bitumen | 3.19 | 1.17 | 2.97 | −2.82 |
| Bitumen + 1% polyphosphoric acid | 6.43 | 3.60 | 5.33 | −1.98 |
| Bitumen + 10% rubber crumb (Grade 1) | 7.77 | 4.70 | 6.19 | −1.75 |
| Bitumen + 1% polyphosphoric acid + 5% rubber crumb | 7.36 | 4.61 | 5.75 | −1.36 |
| Bitumen + 0.5% polyphosphoric acid + 5% rubber crumb | 9.13 | 5.48 | 7.31 | −2.32 |

A major gain in modulus values is noted, i.e. the complex modulus $G^*$, elastic modulus $G'$ and viscosity modulus $G''$ at ambient temperature 25° C., with the addition of 10 wt. % vulcanized rubber crumb.

Similarly, a substantial lowering is observed of the thermal susceptibility index SI on and after the addition of 5 wt. % vulcanized rubber crumb.

4/Rheological Properties of Bitumen Modified with Polyphosphoric Acid and Added Rubber Crumb. Comparison of Different Rubber Crumb Products.

The results obtained concern the complex modulus $G^*$, elastic component $G'$, viscous component $G''$ and the phase angle $\delta$.

In this example the methods of preparing the bitumen and rheology tests were conducted as described previously.

The different grades of rubber crumb were compared on the basis of one same formulation: Bitumen+1 wt. % polyphosphoric acid+5 wt. % vulcanized rubber crumb.
i) Acid modified bitumen with Grade 1 rubber crumb;
ii) Acid modified bitumen with Grade 2 rubber crumb;
iii) Acid modified bitumen with Grade 3 rubber crumb;
iv) Acid modified bitumen with Grade 4 rubber crumb.

The addition of 5 wt. % vulcanized rubber crumb in the presence of polyphosphoric acid (1 wt. % PPA) leads to obtaining markedly improved rheological properties. An increase in the modulus values $G'$ and $G''$ is observed as well as a major reduction in the phase angle $\delta$.

Table 8 below groups together the values measured at different temperatures with a frequency of 1.5 Hz.

TABLE 8

|  | $G^*$ −25° C. $10^6$ Pa | $G^*$ −60° C. $10^3$ Pa | $\delta$ −40° C. (Pa) | Tc (° C.) |
|---|---|---|---|---|
| Bitumen + 1% polyphosphoric acid + 5% Grade 1 crumb | 0.736 | 13.891 | 53.70 | 83.1 |
| Bitumen + 1% polyphosphoric acid + 5% Grade 2 crumb | 1.10 | 23.194 | 53.48 | 89.0 |
| Bitumen + 1% polyphosphoric acid + 5% Grade 3 crumb | 1.12 | 21.573 | 50.66 | 87.3 |
| Bitumen + 1% polyphosphoric acid + | 0.950 | 17.831 | 50.11 | 84.9 |

TABLE 8-continued

|  | G* −25° C. 10⁶ Pa | G* −60° C. 10³ Pa | δ −40° C. (Pa) | Tc (° C.) |
|---|---|---|---|---|
| 5% Grade 4 crumb |  |  |  |  |

The behaviour of the modified bitumen is distinctly more elastic.

Among the different grades of rubber crumb tested, grades 2 and 3 (Necaflex) appear to have the best properties. Particle size has no significant effect: Dmax<800 μm and Dmax<400 μm.

Grade 1 (Mesallès) appears to perform slightly less well.

Grade 4 (Necaflex), that is cryo-ground, performs substantially less better than grade 2 derived from standard grinding.

Table 9 groups together the modulus values at 25° C. and the thermal susceptibility index SI.

TABLE 9

|  | G* −25° C. 10⁵ Pa | G' −25° C. 10⁵ Pa | G" −25° C. 10⁵ Pa | SI |
|---|---|---|---|---|
| Bitumen + 1% polyphosphoric acid + 5% Grade 1 crumb | 7.36 | 4.61 | 5.75 | −1.36 |
| Bitumen + 1% polyphosphoric acid + 5% Grade 2 crumb | 11.00 | 7.30 | 8.26 | −1.18 |
| Bitumen + 1% polyphosphoric acid + 5% Grade 3 crumb | 11.20 | 7.45 | 8.30 | −1.29 |
| Bitumen + 1% polyphosphoric acid + 5% Grade 4 crumb | 9.51 | 6.62 | 6.83 | −1.33 |

Rubber crumb grades 2 and 3 appear to perform substantially better.

EXAMPLE 4

Influence of Rubber Incorporation Time. PROAS 80/100 (Spain)

A 80/100 Pen grade bitumen was used for the tests. It was a bitumen available from PROAS, Spain.

The crumb used was Necaflex crumb of particle size: Dmax<400 microns (Grade 3).

Incorporation was made in the bitumen modified with 1 wt. % polyphosphoric acid at 170° C.

The composition was: Bitumen+1 wt. % 105 polyphosphoric acid+5 wt. % vulcanized rubber crumb.

Two incorporation times were tested:
i) 2 h;
ii) 10 h.

Table 10 below gives the values measured at different temperatures and frequency of 1.5 Hz (Bitumen+1 wt. % polyphosphoric acid+5 wt. % Grade 3 crumb)

TABLE 10

|  | G* −25° C. 10⁶ Pa | G' −60° C. 10³ Pa | δ −40° C. (Pa) | Tc (° C.) |
|---|---|---|---|---|
| Mixing: 2 h | 1.12 | 21.573 | 50.6 | 87.3 |
| Mixing: 10 h | 1.53 | 37.141 | 46.1 | 95.1 |

A marked improvement in performance was noted with mixing time (as with SBS): the phase angle δ (40° C.) is substantially reduced and the critical temperature increases from 87° C. to 95° C.

EXAMPLE 5

Bitumen with Added Acid/Crumb Premix

A 80/100 Pen grade bitumen was used for the tests. It was a bitumen available from PROAS, Spain.

A premix was made, at ambient temperature, with the Grade 2 rubber crumb and 105% condensed polyphosphoric acid such as described in example 2. This premix was made to a ratio of 5/1: 83.30 g crumb per 16.65 g acid (100 g of premix).

This premix was incorporated into the hot bitumen following identical procedure to that used in example 1, in order to obtain a modified bitumen containing 1% acid and 5% crumb.

The results were compared with those obtained for direct mixing such as described in example 3 under point 4 (cf. Table 8).

Table 11 below groups together the values measured at different temperatures with a frequency of 1.5 Hz (Bitumen+1 wt. % polyphosphoric acid+5 wt. % crumb).

TABLE 11

|  | G* −25° C. 10⁶ Pa | G* −60° C. 10³ Pa | δ −40° C. (Pa) | Tc (° C.) |
|---|---|---|---|---|
| Bitumen with added premix | 0.882 | 19.721 | 51.8 | 87.5 |
| Bitumen with direct mixing of additive | 1.10 | 23.194 | 51.1 | 89.0 |

It is ascertained that the critical temperature is substantially higher with direct hot mixing of the different constituents in the bitumen.

The premix, at ambient temperature and before incorporation in the hot bitumen, leads to excellent performance either similar to or scarcely inferior to that achieved with direct mixing.

EXAMPLE 6

Behaviour at Low Temperature. 80/100 PROAS (Spain)

A 80/100 Pen grade bitumen was used for the tests. It was a bitumen available from PROAS, Spain.

Low temperature cracking is an important factor to be taken into consideration when formulating bituminous mixes. Specifications for binders are designed so that the corresponding mixes have good resistance to low temperatures. In Europe, the properties of low temperature binders are generally assessed using the Fraass breaking point. In the USA, SHRP has developed a criterion based on the rigidity of bitumen samples evaluated by means of a creep test: Bending Beam Rheometer test (BBR).

Another way of approaching the properties of low temperature binders is to assess their glass transition temperature (Tg) either by differential scanning calorimetry (DSC) or by dynamic mechanical analysis (DMA).

In the article "Evaluation of the Low Temperature Properties of Bituminous Binders Using Calorimetry and Rheology" (J. P. Planche et al., Eurobitume, Luxembourg, 1995), the authors show that there exists a good correlation between the Tg value (measured by DSC or DMA) and the critical temperatures defined by BBR creep testing (S=300 MPa and m>0.3).

The glass transition temperature Tg was measured by DSC on 80/100 Proas bitumen. The influence of the addition of 10 wt. % vulcanized rubber crumb was examined as well as the system containing 1 wt. % polyphosphoric acid+5 wt. % vulcanised rubber crumb.

Table 12 below groups together the characteristic values: Tg, but also G*×sin δ (fatigue criterion at ambient temperature) and the upper critical temperature Tc+.

TABLE 12

|  | Tg (° C.) | G* –25° C. $10^6$ Pa | G* × sin δ 25° C. $10^6$ Pa | Tc+ (° C.) |
|---|---|---|---|---|
| Reference bitumen (80/100 Proas) | −27 | 0.31 | 0.288 | +64.4 |
| Bitumen + 10% Grade 1 rubber crumb | −23 | 0.776 | 0.618 | +79.5 |
| Bitumen + 1% polyphosphoric acid + 5% Grade 1 crumb | −29 | 0.736 | 0.57 | +83.1 |

The Tg of 80/100 Proas bitumen is relatively low: Tg=−27° C.

The addition of 10 wt. % vulcanized rubber crumb brings the Tg up by 6° C.: Tg=−23° C.

With the addition of 5 wt. % vulcanized rubber crumb and 1 wt. % polyphosphoric acid, the Tg falls by 2° C.: Tg=−29° C.

This lower Tg corresponds to better bitumen resistance to low temperature cracking.

EXAMPLE 7

Influence of Rubber Type, 80/100 PROAS (Spain)

A 80/100 Pen grade bitumen was used for the tests. It was a bitumen available from PROAS, Spain.

Two types of rubber were specially prepared (lab): vulcanized rubber with no carbon black added, and vulcanized rubber containing 50 percent Carbon Black N234 Cabot elastomer.

Crumb was obtained by cryo-grinding (lab scale): Dmax particle size<500 microns.

Two types of crumb were obtained:
i) Vulcanized rubber crumb containing carbon black
ii) Vulcanized rubber crumb with no carbon black.

The polyphosphoric acid used was 105% condensed acid (cf. example 2).

Table 13 below groups together the values measured at different temperatures at a frequency of 1.5 Hz (Bitumen+1 wt. % polyphosphoric acid+5 wt. % crumb).

TABLE 13

|  | G* –25° C. $10^6$ Pa | G* –60° C. $10^3$ Pa | δ = −40° C. (Pa) | Tc (° C.) |
|---|---|---|---|---|
| Crumb: rubber with carbon black (50 percent) | 0.864 | 17.032 | 54 | 85.7 |
| Crumb: rubber without carbon black | 0.965 | 22.442 | 50 | 89.5 |

A much higher critical temperature was ascertained for the crumb without carbon black: this may be due to the higher rubber content.

The presence of carbon black, and hence the type of carbon black, does not appear to have any impact on the performance of the modified bitumen.

EXAMPLE 8

Preparation of a Modified Bitumen and Determination of its Properties Without or After Aging A road bitumen A from Proas, having a penetration grade of 110 1/10 mm and Ring and Ball softening temperature of 44° C. was modified using the method of the present invention and the formula given in Table 14 below:

TABLE 14

| Formula of modified bitumen 1: | |
|---|---|
| Ingredient | Weight % |
| Bitumen A | 94% |
| Vulcanized rubber crumb | 5% |
| Polyphosphoric acid | 1% |

The nominal size of the vulcanized rubber crumb used was between 0 and 500 µm with a median diameter of 320 µm.

The polyphosphoric acid used was a 105% condensed acid (Rhodia).

Production was conducted at 180° C. in a laboratory by first adding the vulcanized rubber crumb to the bitumen under vigorous stirring for 90 minutes, then adding the polyphosphoric acid and maintaining stirring for 30 minutes.

After cooling, the modified bitumen 1 was evaluated as such, i.e. with no simulated aging, and after accelerated aging under the effect of air and temperature (Rolling Thin Film Oven Test—RTFOT, in accordance with standard EN 12607-1) using the tests described in table 15 below:

TABLE 15

| Results of tests on modified bitumen 1, initial and aged | | | | |
|---|---|---|---|---|
| Test | Method | Modified bitumen 1 - initial | Modified bitumen 1 - RTFOT aged | |
| Deformation temperature under BBR stress | (AASHTO TP1-98) | $T^*_{S=300\,MPa}$ = −24.8° C. $(T^{**}_m)_{=0.3}$ = −25.9° C. | | |
| Dynamic Shear Rheometer measurements (DSR) at 10 rad/s | (AASHTO TP5-98) | G*(25° C.) = 775 kPa δ (40° C.) = 64.2° Slope G* = f(T) between 20–60° C. = −0.044 $T_{1\,kPa}$*** = 80.4° C. | G*(25° C.) = 1450 kPa $T_{2.2\,kPa}$*** = 81.4° C. | Ratio = 1.87 ΔT = 1° C. |

TABLE 15-continued

Results of tests on modified bitumen 1, initial and aged

| Test | Method | Modified bitumen 1 - initial | Modified bitumen 1 - RTFOT aged |
|---|---|---|---|
| Plasticity index (PI)**** | SHRP | 105.2° C. | |
| Cohesion | (NF T 66027) | 1.05 J/cm² $T_{max}$ = 40° C. | |

*Temperature such that the creep modulus S measured after 60 s with BBR test is 300 MPa.
**Temperature such that the absolute value m of the slope of the log curve of the creep modulus in relation to time log measured after 60 s with BBR test is 0.3.
***Temperature such that the modulus G*/sin d measured at 10 rad/s with DSR test is 1.1 kPa (or 2.2 kPa).
****The PI is defined as the difference between the highest of the lower limit temperatures (T S = 300 Mpa or T m = 0.3) and the lowest of the upper limit temperatures (T 1 kPa or T 2.2 kPa).

The results obtained for modified bitumen 1, initial or aged, are therefore comparable with those obtained with various commercially available polymer-modified bitumens (article by B. Brulé and J. J. Potti, Carreteras 121, 2002). According to the evaluation scale proposed in this study, the modified bitumen obtains a score of 9, comparable with that of commercially modified bitumens and much higher than that obtained for a standard non-modified bitumen (typical value of 3 for a 70/100 bitumen).

EXAMPLE 9

Preparation of a Bitumen Modified on Industrial Scale

The formula in preceding example 8 was made on an industrial scale to obtain several tons of modified bitumen 2 having the same formula as modified bitumen 1 and using the same ingredients. This modified bitumen 2 was characterized after production. The tests and results are grouped together in Table 16 below:

TABLE 16

| Test | Method | Unit | Result: modified bitumen 2 |
|---|---|---|---|
| Penetration | EN 1426 | ¹/₁₀ mm | 65 |
| Ring and Ball Test | EN 1427 | ° C. | 55 |
| Elastic return | NLT 329 | % | 28 |
| Viscosity at 140° C. | ASTM D4402 | mPa · s | 1136 |

This modified bitumen 2 was used to produce and apply a semi-grained bituminous mix 0/12 (Mix A) as per Spanish standard grade S12 containing 4.8 parts binder per 100 parts dry aggregate and 5 vol. % void ratio.

The Marshall stability of the mix prepared was measured and compared with that of the same mix made using a non-modified B 40/50 bitumen from Proas having a penetration grade of 42 ¹/₁₀ mm and Ring and Ball (R&B) reference softening point of 55° C. (Mix B). The results are given in Table 17 below.

TABLE 17

Comparison between mixes obtained from a modified bitumen of the invention or non-modified bitumen.

| Test | Method | Unit | Mix A | Mix B |
|---|---|---|---|---|
| Type of binder | | | Modified bitumen 2 | Non-modified bitumen B |
| Binder content | | Parts per cent (ppc) | 4.77 | 4.75 |
| Void ratio | NLT 168 | Vol. % | 5.4 | 4.0 |
| Marshall stability | NLT 159 | kgf | 2120 | 1224 |

The application of mix A using conventional worksite equipment (finishing) did not give rise to any particular problem and was deemed very satisfactory and comparable with mix B in terms of ease of handling. This is not the case with current commercially available polymer-modified bitumens which have reduced handling ability compared with conventional bitumen mixes.

EXAMPLE 10

Comparison Between Bitumens with Added Rubber Crumb of Different Origins and Compositions 5 vulcanized rubber crumb products of varied origins and compositions were each mixed with a road bitumen B supplied by Petrogal, of Pen grade 78 ¹/₁₀ mm and Ring and Ball softening point of 45.6° C., using the following procedure and compositions:

| Bitumen B: | 94 wt. % |
|---|---|
| Vulcanized rubber crumb: | 5 wt. % |
| Polyphosphoric acid: | 1 wt. % |

The polyphosphoric acid used was a 105% condensed acid (Rhodia).

The bitumens were laboratory produced at 180° C. adding firstly the vulcanized rubber crumb and maintaining vigorous stirring for 90 min, then adding the polyphosphoric acid and maintaining stirring for 30 min.

By way of comparison, mixes were also produced with each of the 5 rubber crumb products and bitumen B without the addition of acid, i.e. as per the following composition:

| Bitumen B: | 95 wt. % |
|---|---|
| Vulcanized rubber crumb: | 5 wt. % |

The mixes were laboratory produced a 180° C. adding the vulcanized rubber crumb and maintaining vigorous stirring for 120 min.

The crumb products were characterized by their volume median diameter measured by laser diffraction on a Malvern Multisizer 2000. The results are grouped together in Table 18 below:

TABLE 18

Characterization of the 5 rubber crumb products

|  |  | Crumb a | Crumb b | Crumb c | Crumb d | Crumb e |
|---|---|---|---|---|---|---|
| Origin |  | Unknown | 100 wt. % derived from used truck tyres | 100 wt. % derived from used truck tyres | 70 wt. % derived from used truck tyres 30 wt. % from used car tyres | 70 wt. % derived from used truck tyres 30 wt. % from used car tyres |
| Nominal size | μm | 0-500 | 0-800 | 0-400 | 0-800 | 0-400 |
| Median diam. | μm | 320 | 411 | 419 | 524 | 394 |

The modified bitumens were evaluated using the tests given in Table 19 below:

TABLE 19

| Mix |  | Method | Unit |  | a1 | a0 | B1 | b0 | c1 | c0 | d1 | d0 | e1 | e0 |
|---|---|---|---|---|---|---|---|---|---|---|---|---|---|---|
| Composition | Bitumen B |  | Wt. % | 100 | 94 | 95 | 94 | 95 | 94 | 95 | 94 | 95 | 94 | 95 |
|  | Crumb type |  |  | — | a | a | b | b | c | c | d | d | e | e |
|  | Crumb content |  | Wt. % | 0 | 5 | 5 | 5 | 5 | 5 | 5 | 5 | 5 | 5 | 5 |
|  | Polyphosphoric Acid |  | Wt. % | 0 | 1 | 0 | 1 | 0 | 1 | 0 | 1 | 0 | 1 | 0 |
| Characterization Test | Penetration | EN 1426 | 1/10 mm | 78 | 53 | 63 | 53 | 63 | 53 | 64 | 50 | 64 | 52 | 65 |
|  | Ring & Ball (R&B) | EN 1427 | ° C. | 45.6 | 53 | 49.2 | 56.2 | 51.2 | 56.4 | 51.8 | 55.6 | 51.1 | 56.4 | 51.2 |
|  | PI | EN12591 |  | −1.3 | −0.3 | −0.8 | 0.4 | −0.3 | 0.5 | −0.1 | 0.1 | −0.3 | 0.4 | −0.2 |
|  | Ductility at 5° C. | NLT 126 | Cm |  | 14 | 19 | 10 | 14 | 9 | 11 | 8 | 11 | 9 | 12 |
|  | Elastic return | NLT 329 | % |  | 13 | 8 | 36 | 33 | 33 | 35 | 36 | 36 | 31 | 32 |
|  | Viscosity at 140° C. | ASTM D4402 | mPa · s |  | 550 | 393 | 1077 | 499 | 1015 | 722 | 963 | 420 | 1022 | 494 |
|  | Viscosity at 160° C. | ASTM D4402 | mPa · s |  | 218 | 168 | 280 | 252 | 404 | 304 | 387 | 195 | 406 | 228 |
|  | Viscosity at 180° C. | ASTM D4402 | mPa · s |  | 108 | 86 | 141 | 106 | 203 | 111 | 194 | 103 | 193 | 108 |
| Storage stability |  | NLT 328 |  |  |  |  |  |  |  |  |  |  |  |  |
|  | High penetration |  | 1/10 mm |  | 49 | 52 | 48 | 53 | 48 | 55 | 48 | 54 | 47 | 53 |
|  | Low penetration |  | 1/10 mm |  | 65 | 80 | 65 | 78 | 59 | 78 | 67 | 78 | 50 | 78 |
|  | Penetration difference |  | 1/10 mm |  | −16 | −28 | −17 | −25 | −11 | −23 | −19 | −24 | −3 | −25 |
|  | High Ring & Ball |  | ° C. |  | 53.4 | 50.8 | 54.2 | 50.2 | 53.8 | 50.6 | 54.8 | 51.2 | 54.4 | 51.0 |
|  | Low Ring & Ball |  | ° C. |  | 61.2 | 55.6 | 59.6 | 55.7 | 58.8 | 55.2 | 60 | 56.3 | 59.6 | 56.3 |
|  | R&B difference |  | ° C. |  | −7.8 | −4.8 | −5.4 | −5.5 | −5 | −4.6 | −5.2 | −5.1 | −5.2 | −5.3 |

In all cases, the addition of polyphosphoric acid brought an improvement in the mechanical properties of the bitumen modified with vulcanized rubber crumb, irrespective of crumb origin, and with storage stability remaining at the same level as for acid-free mixes.

EXAMPLE 11

Emulsion of Modified Bitumen of the Invention

Mixture b1 in example 10 was emulsified using a laboratory colloidal mill by Emulbitume. For this purpose the modified binder was brought to a temperature of 170° C. imparting a viscosity of approximately 200 mPa·s.

Two different formulas were used corresponding to two potential applications of the invention: an emulsion for surface coating (Emulsion 1) and an emulsion for cold flow mixes (Emulsion 2).

The compositions of each of the emulsions and their corresponding properties are grouped together in Table 20 below:

TABLE 20

Properties and compositions of emulsions of the modified bitumen of the present invention

| Emulsion | | Method | Unit | Emulsion 1 | Emulsion 2 |
|---|---|---|---|---|---|
| Composition | Modified bitumen b1 | | Wt. % emulsion | 64 | 60 |
| | Emulsifier | | Type | Fatty diamine* | Fatty polyamine** |
| | | | Wt. % emulsion | 0.3 | 0.4 |
| | pH aqueous phase | | — | 2.5 | 2.5 |
| Characterization | Saybolt Furol viscosity at 50° C. | NLT 138 | S | 30 | 20 |
| | Electric charge of particles | NLT 194 | — | Positive | Positive |
| | Water content | NLT 137 | Wt. % | 35 | 40 |
| | Residual binder | NLT 139 | Wt. % | 65 | 60 |
| | Thinner by distillation | NLT 139 | Wt. % | 1 | 0 |
| | Sedimentation at Day 7 | NLT 140 | % | 0 | 8 |
| | Sieve Residue | NLT 142 NLT 147 | Wt. % | 0.02 | 0.04 |
| Characterization of residue by evaporation | Penetration | EN 1426 | 1/10 mm | 58 | 51 |
| | Ring & Ball | EN 1427 | ° C. | 55.2 | 56.4 |
| | Ductility at 5° C. | NLT 126 | Cm | 10 | 9 |
| | Elastic recovery | NLT 329 | % | 35 | 34 |

*ASSIER ® 130 by Kao
**ASSIER ® 208 by Kao

The modified binder of the invention may therefore be emulsified with technologies used in the practice giving surface emulsions (emulsion type 1) or mixing emulsions (emulsion type 2) whose properties meet corresponding specifications.

EXAMPLE 12

A rubber crumb produced by Mésallès was mixed with a road bitumen C supplied by Repsol Puertollano, Penetration grade 80 1/10 mm and Ring and Ball softening point of 48.6° C. to obtain a concentrated modified binder having the composition:

| Bitumen C | 88 wt. % |
|---|---|
| Rubber crumb | 10 wt. % |
| Polyphosphoric acid | 2 wt. % |

The polyphosphoric acid used was a 105% condensed acid (Rhodia).

Production was performed in a laboratory at 180° C. adding firstly the rubber crumb and maintaining vigorous stirring for 90 min, then adding the polyphosphoric acid and maintaining stirring for 30 min.

The modified concentrated binder was then diluted to a 50/50 weight ratio with a bitumen D from Cepsa of Penetration grade 91 1/10 mm and Ring and Ball softening point of 49.2° C. to obtain a new modified bitumen this time having a global crumb content of 5% and global quantity of polyphosphoric acid of 1%.

The concentrated binder and corresponding modified bitumen were evaluated using the tests indicated in Table 21 below:

TABLE 21

| | Standard | Unit | | Concentrated modified binder | Modified bitumen 3 |
|---|---|---|---|---|---|
| Bitumen C | | Wt. % | 100 | 88 | — |
| Crumb content | | Wt. % | — | 10 | — |
| Polyphosphoric acid | | Wt. % | — | 2 | — |
| Modified concentrated binder | | Wt. % | — | — | 50 |
| Bitumen D | | Wt. % | — | — | 50 |
| Penetration | EN1426 | 1/10 mm | 80 | 34 | 52 |
| Ring and Ball | EN 1427 | ° C. | 48.5 | 83.0 | 56.2 |
| PI | EN12591 | | −0.4 | 3.8 | 0.3 |
| Elastic recovery | NLT 329 | % | | 38 | 13 |
| Viscosity 140° C. | ASTM D4402 | mPa · s | | — | 600 |
| Viscosity 150° C. | ASTM D4402 | mPa · s | | 5700 | — |
| Viscosity 160° C. | ASTM D4402 | mPa · s | | 2200 | 242 |
| Viscosity 180° C. | ASTM D4402 | mPa · s | | 840 | 121 |

The modified bitumen obtained by diluting a concentrated modified binder therefore has improved properties compared with a non-modified bitumen and gives comparable results to those given in the preceding examples with direct addition of 5% crumb and 1% acid.

The invention claimed is:

1. Method for preparing a bituminous binder comprising the following successive steps:
   a) mixing 0.05 to 5 wt. % acid, 0.5 to 25 wt. % rubber crumb and 70 to 99.5 wt. % bitumen heated to a temperature of between 120 and 220° C., b) maintaining the mixture at a temperature of between 120 and 220° C. for a time of between 15 minutes and 10 hours while stirring, and c) optionally degassing any air bubbles which may have occurred in the mixture, wherein the acid is a phosphoric acid or polyphosphoric acid.

2. Method according to claim 1, wherein step a) is performed by mixing the bitumen and acid followed by the addition of rubber crumb.

3. Method according to claim 1, wherein step a) is performed by pre-mixing the acid and rubber crumb before their addition to the bitumen.

4. Method according to claim 1, wherein step a) is performed by mixing at least part of the bitumen heated to a temperature of between 120 and 220° C., and the rubber crumb adding the acid to the mixture of bitumen and rubber crumb and adding any remaining bitumen.

5. Bituminous binder obtained using the method according to claim 1.

6. Bituminous binder according to claim 5, wherein the ratio at 135° C. of the acid containing bituminous binder viscosity to the viscosity of an identical version of the bituminous binder which is acid-free lies between 10 and 70% and wherein the difference in critical temperature between the acid-containing binder and the acid-free binder lies between 1 and 50° C.

7. A building formed from building construction materials which contain the bituminous binder of claim 5 or 6.

8. A building construction material or road construction material which contains as a sealant the bituminous binder of claim 5 or 6.

9. Bituminous concrete containing the binder according to claim 6 and a selected quantity of aggregate.

10. Method for preparing a bituminous concrete wherein the aggregate is added to the binder according to claim 5 or 6 under stirring at a temperature of between 120 and 220° C.

11. Method for preparing a bituminous concrete comprising the following steps:
   i) Preparing a bitumen emulsion by mixing water, a bituminous binder according to claim 5 or 6 and an emulsifier at ambient temperature,
   ii) incorporating aggregate into the bitumen emulsion obtained at step i), under stirring at ambient temperature,
   iii) spreading the emulsion obtained at step ii) to obtain a uniform layer of the mixture obtained at step ii),
   iv) breaking the bitumen emulsion.

12. A roadway construction having a surface coating formed of the bituminous concrete of claim 9.

13. Method according to claim 1, wherein prior to step (a), a pre-mix is formed containing between 0.02 wt. % and 91 wt. % acid and between 9 and 99.98 wt. % rubber crumb.

14. Bituminous binder containing 0.05 to 5% of acid, the acid being phosphoric or polyphosphoric acid, 0.5 to 25% of rubber crumb and 70 to 99.5% bitumen and having the following characteristics: the ratio at 135° C. of the acid-containing bituminous binder viscosity to the viscosity of an identical version of the bituminous binder which is acid-free lies between 10 to 70% and the difference in critical temperature between the acid containing binder and the acid-fee binder lies between 1 and 50° C.

15. Method according to claim 1, wherein the mixture in step b) is maintained at a temperature of between 120 and 220° C. for a time of between 15 minutes and 3 hours.

16. A building having a roof, wherein the roof is formed from building materials which contain the bituminous binder of claim 5 or 6.

17. A building construction material or road construction material which contains as a surface coating the bituminous binder of claim 5 or 6.

18. A building construction material or road construction material which contains as a reflective cracking protection system the bituminous binder of claim 5 or 6.

19. A roadway construction as a reflective cracking protection system formed of the bituminous concrete of claim 9.

20. Method according to claim 1, wherein rubber crumb is obtained by grinding tires, rubber mats or shoe soles.

21. Bituminous binder according to claim 14, wherein the rubber crumb is obtained by grinding tires, rubber mats or shoe soles.

\* \* \* \* \*